(12) United States Patent
Moyes

(10) Patent No.: US 7,324,803 B2
(45) Date of Patent: Jan. 29, 2008

(54) EMERGENCY SETTINGS FOR CELLULAR TELEPHONES

(76) Inventor: Christine Moyes, 710 N. Gadsden, No. 4, Tallahassee, FL (US) 32303

( * ) Notice: Subject to any disclaimer, the term of this patent is extended or adjusted under 35 U.S.C. 154(b) by 0 days.

(21) Appl. No.: 11/176,039

(22) Filed: Jul. 7, 2005

(65) Prior Publication Data

US 2007/0010235 A1    Jan. 11, 2007

(51) Int. Cl.
*H04M 11/04* (2006.01)
(52) U.S. Cl. ............... 455/404.1; 455/414.1; 455/414.3; 455/418; 455/521; 455/90.1; 455/90.2
(58) Field of Classification Search ............ 455/404.1, 455/414.1, 414.3, 418, 521, 90.1, 90.2
See application file for complete search history.

(56) References Cited

U.S. PATENT DOCUMENTS

| | | | |
|---|---|---|---|
| 5,086,391 A | 2/1992 | Chambers | |
| 5,088,037 A | 2/1992 | Battaglia | |
| 5,521,812 A | 5/1996 | Feder et al. | |
| 5,603,025 A * | 2/1997 | Tabb et al. | 707/2 |
| 5,668,954 A | 9/1997 | Feder et al. | |
| 5,913,685 A | 6/1999 | Hutchins | |
| 6,758,811 B1 * | 7/2004 | Feder | 600/300 |
| 2004/0107182 A1 * | 6/2004 | Yoshida | 707/1 |

* cited by examiner

Primary Examiner—Steve M. D'Agosta
(74) Attorney, Agent, or Firm—John Wiley Horton

(57) ABSTRACT

New emergency settings for a cellular telephone. The emergency settings allow the user to access emergency instructional information from their cellular telephone when the user is an emergency situation. In the preferred embodiment sets of sequential procedural instructions are programmed into the internal memory of the cellular telephone for various emergency situations. A selection means is provided for the user to allow the user to select the set of sequential procedural instructions that is desired. When the user makes the selection, a function recalls the instructions from the internal memory and displays the instructions to the user.

6 Claims, 5 Drawing Sheets

EMERGENCY SETTINGS FOR CELLULAR TELEPHONES

BACKGROUND OF THE INVENTION

1. Field of the Invention

This invention relates to the field of software programs for cellular telephones. More specifically, the invention comprises emergency settings for cellular telephones whereby a user can access procedural instructions for managing emergency situations.

2. Description of the Related Art

Various devices are known for providing instructional assistance to individuals during emergency situations. One example is a cardiopulmonary resuscitating (CPR) computer aiding device described in U.S. Pat. No. 5,913,685 to Hutchins. Hutchins describes a program that can be operated on a personal computer or network and provides guidance to rescue personnel in administering CPR on a victim.

Another example is a portable rescue administration aid device described in U.S. Pat. No. 5,088,037 to Battaglia. Battaglia describes a portable device which is used by a rescuer to access sequential procedural instructions for carrying out rescue operations. The device is configured to determine the appropriate procedure based on parameter entries input by the rescuer.

Yet another example is an emergency information apparatus described in U.S. Pat. No. 5,521,812 to Feder et al. Feder et al. describe a portable unit which can be carried to a rescue site. The unit provides rescue assistance by playing sequential emergency instructions which are prerecorded on a recording medium such as compact disc.

Although these devices are helpful for rescue personnel, they are not very well suited for the needs of civilians. These devices serve one purpose—to provide rescue assistance. Even if a civilian owned one of these devices, they would not normally have the device with them. Since emergency situations arise unexpectedly, a civilian that owns one of these devices is not likely to have the device with them when it is needed. Also, these devices provide emergency instructions for only a limited range of emergencies. Civilians encounter various emergency situations where it is desirable to have sequential procedural instructions.

Accordingly it would be desirable to have a way of accessing emergency procedure information covering a broad range of possible emergency situations without having to carry an additional electronic device.

BRIEF SUMMARY OF THE PRESENT INVENTION

The present invention comprises new emergency settings for a cellular telephone. The emergency settings allow the user to access emergency instructional information from their cellular telephone when the user is an emergency situation. In the preferred embodiment sets of sequential procedural instructions are programmed into the internal memory of the cellular telephone for various emergency situations. A selection means is provided for the user to allow the user to select the set of sequential procedural instructions that is desired. When the user makes the selection, a function recalls the instructions from the internal memory and displays the instructions to the user. Other novel features of the proposed invention will be discussed in greater detail in the detailed description and claims.

REFERENCE NUMERALS IN THE DRAWINGS

| | | | |
|---|---|---|---|
| 10 | emergency instructional system | 12 | system start |
| 14 | menu | 16 | user select item |
| 18 | internal memory | 20 | retrieve item |
| 22 | user select item | 24 | retrieve item |
| 26 | end | 28 | menu display |
| 30 | emergency instruction icon | 32 | menu icons |
| 34 | procedures links | 36 | cursor select aid |
| 38 | emergency instruction list display | 40 | procedure display |
| 42 | steps links | 44 | step display |
| 46 | explanation | 48 | graphic |
| 50 | menu return | 52 | menu display |
| 54 | list display | 56 | procedure display |

DESCRIPTION OF THE INVENTION

Figure 1:
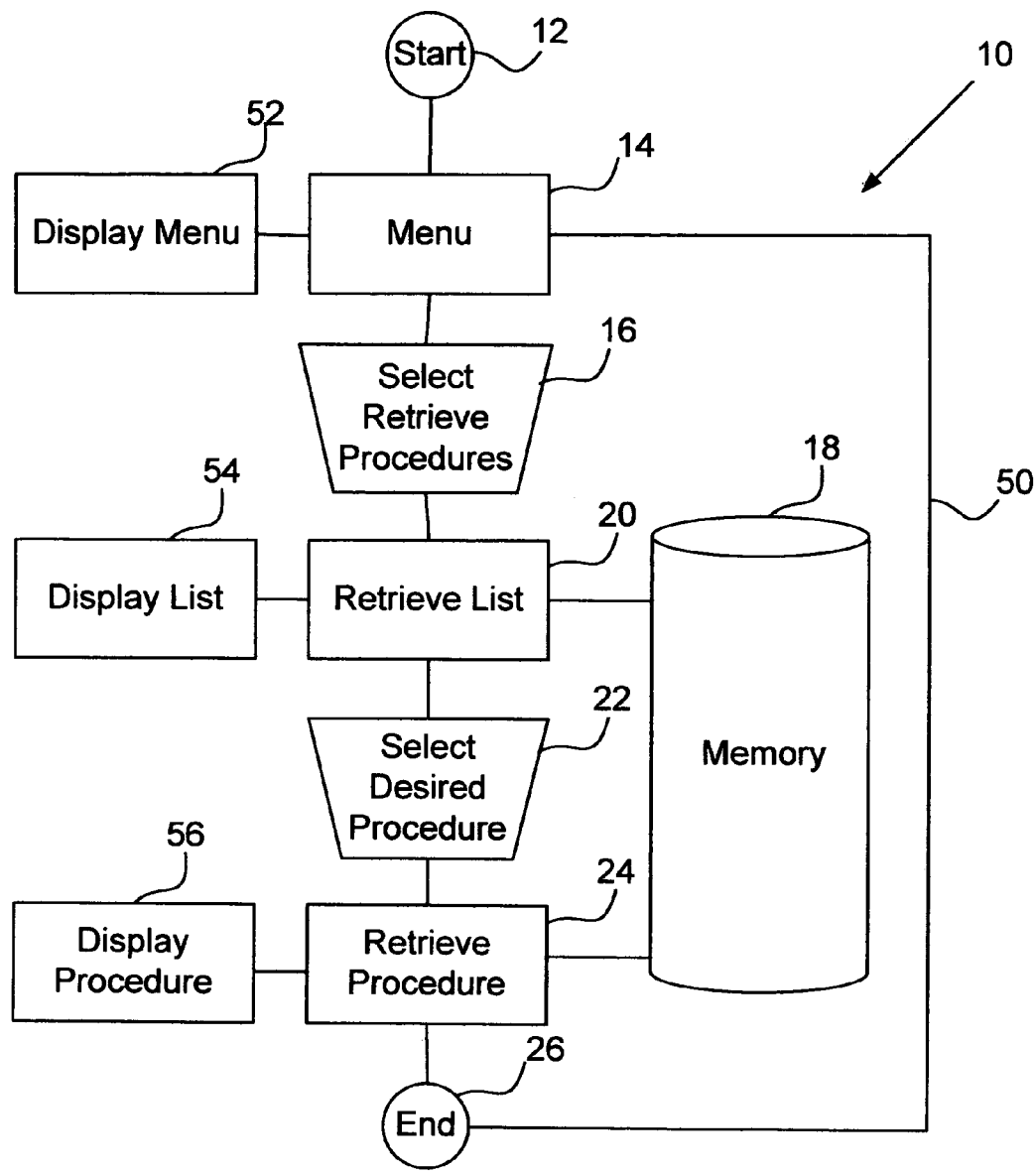
FIG. 1 is a schematic showing the present invention.

A schematic of the present invention, emergency instructional system 10, is illustrated in FIG. 1. Emergency instructional system 10 is generally designed to operate on a cellular telephone. Cellular telephones are the preferred medium for emergency instructional system 10 primarily because cellular telephones are widely used, and most users of cellular telephones have their cellular telephone with them most of the time. Accordingly, most people are likely to have their cellular telephone with them when an emergency situation arises. Emergency instructional system 10 can also be adapted to operate on other common portable electronic devices as well including Personal Digital Assistants (PDAs) and Global Positioning System (GPS) devices.

Start system 12 is provided to initiate emergency instructional system 10 and activate menu 14. Conventionally start system 12 can be an on/off button for turning the cellular phone on and off, but it may also be another button on the phone that is used to access menu 14 after the phone has been turned on. Menu display 52 represents many different menu presentations which may be displayed to the user when menu 14 is activated, one of which is illustrated in greater detail in FIG. 2. Menu 14 generally contains a series of functions that the system can perform. Conventional functions include functions for accessing voice mail, functions for accessing a user's phone book, functions for accessing the cellular telephone's call history, and functions for changing the settings of the cellular phone including ring tones, call forwarding, and phone status. Increasingly cellular telephones come equipped with other functions including multimedia applications and access to the world wide web.

In the preferred embodiment, menu 14 is also provided with a function for allowing the user to access sequential procedural instructions for managing emergency situations. User select item 16 is provided to allow the user to select and trigger this function. This function will be described in greater detail subsequently. Although FIG. 1 shows this function on menu 14, those that are skilled in the art will understand that the function can also be placed on a submenu with other functions, such as on a submenu of the list of functions for changing the settings of the cellular telephone. User select item 16 can be presented in many ways. One example is providing a quick button on the cellular phone that "bypasses" the menu and automatically accesses the function. A menu icon for accessing the emergency procedures can also be provided on the menu display, whereby the user can use a cursor or other buttons on the cellular phone to select the icon. Any selection means, not limited to those previously mentioned, which allows the user to select the function is within the scope of the present invention.

Whenever the user selects user select item 16, the system accesses emergency instructional information from internal memory 18 of the cellular phone via retrieve item 20 and displays information to the user via list display 54. In the preferred embodiment of the present invention, internal memory 18 includes sequential procedural instructions for a variety of emergency situations. When the user selects user select item 16, a list of the various emergency situations for which sequential procedural instructions are available are shown via display list 54. An example of one possible presentation of display list 54 is provided in FIG. 3.

Figure 3:
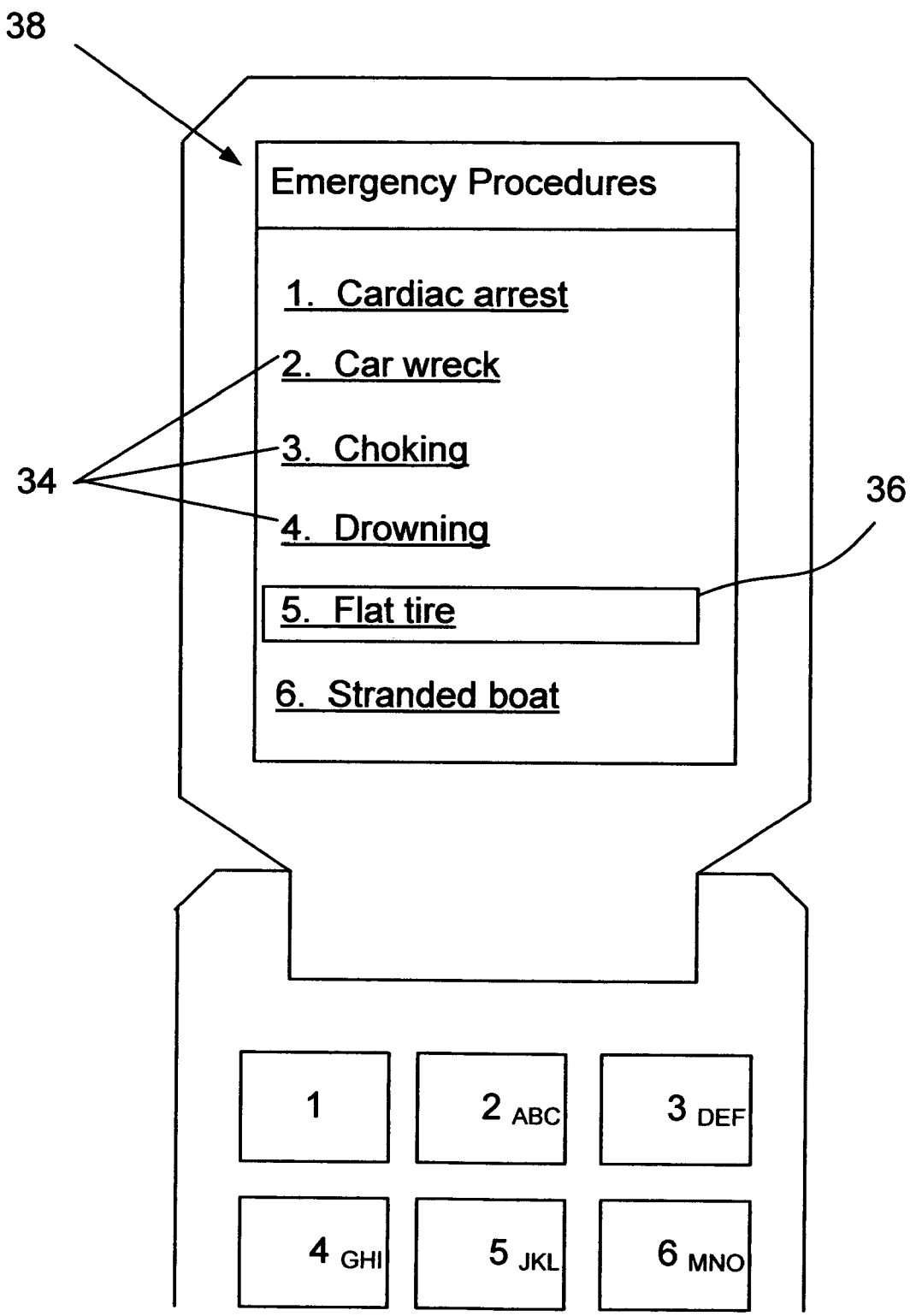
FIG. 3 is a perspective view, showing an emergency instruction list display.

The user then selects which emergency procedure is desired via user select item 22. Like user select item 16, there are many ways that user select item 22 may be presented. One example includes a numerical listing for each of the available emergency procedures. The user can select the number on the touchpad that corresponds with the desired emergency procedure. Another option, which is illustrated in FIG. 3, is to provide a cursor select aid for cursoring to the desired emergency procedure.

Figure 4:
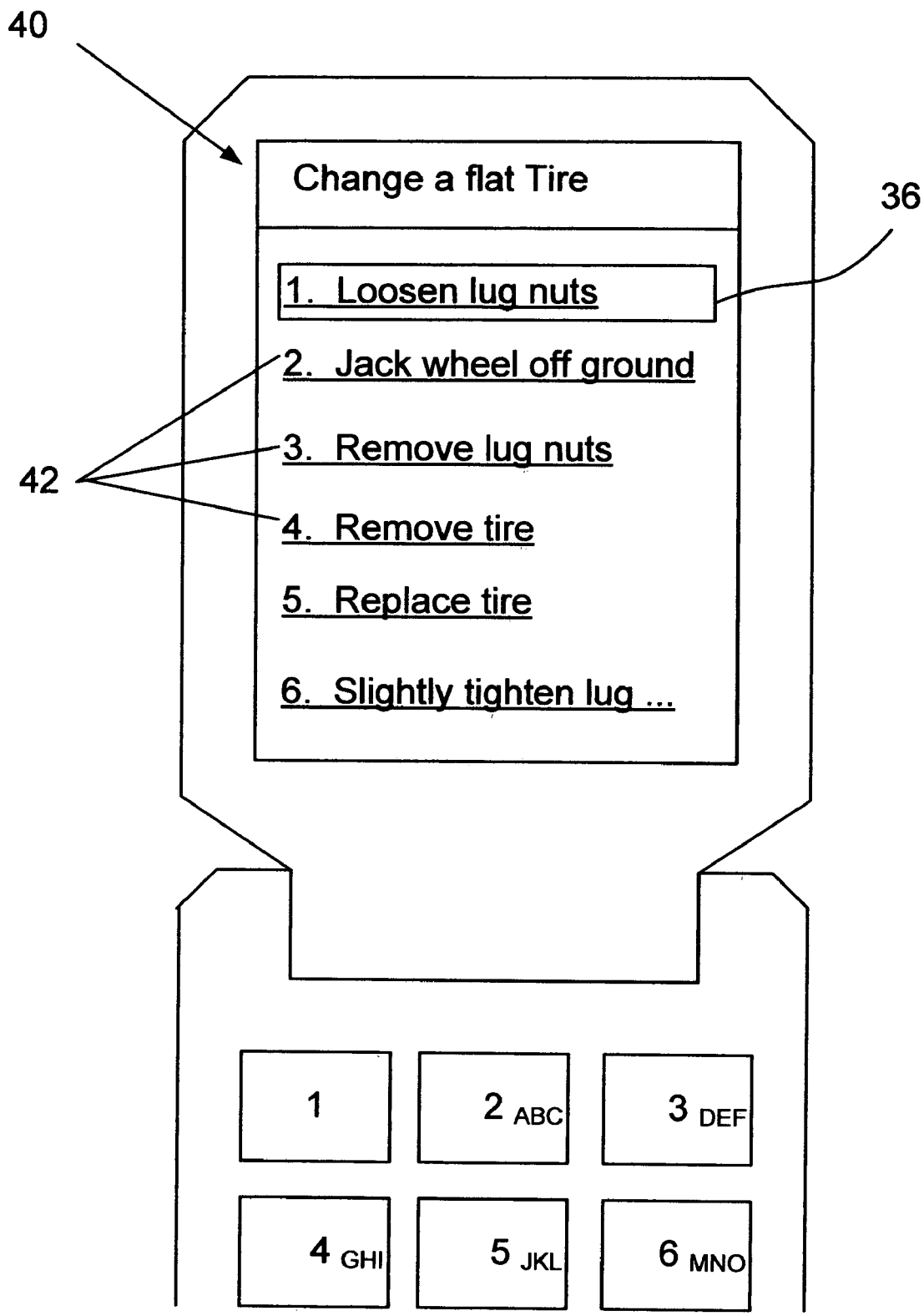
FIG. 4 is a perspective view, showing a procedure display.
Figure 5:
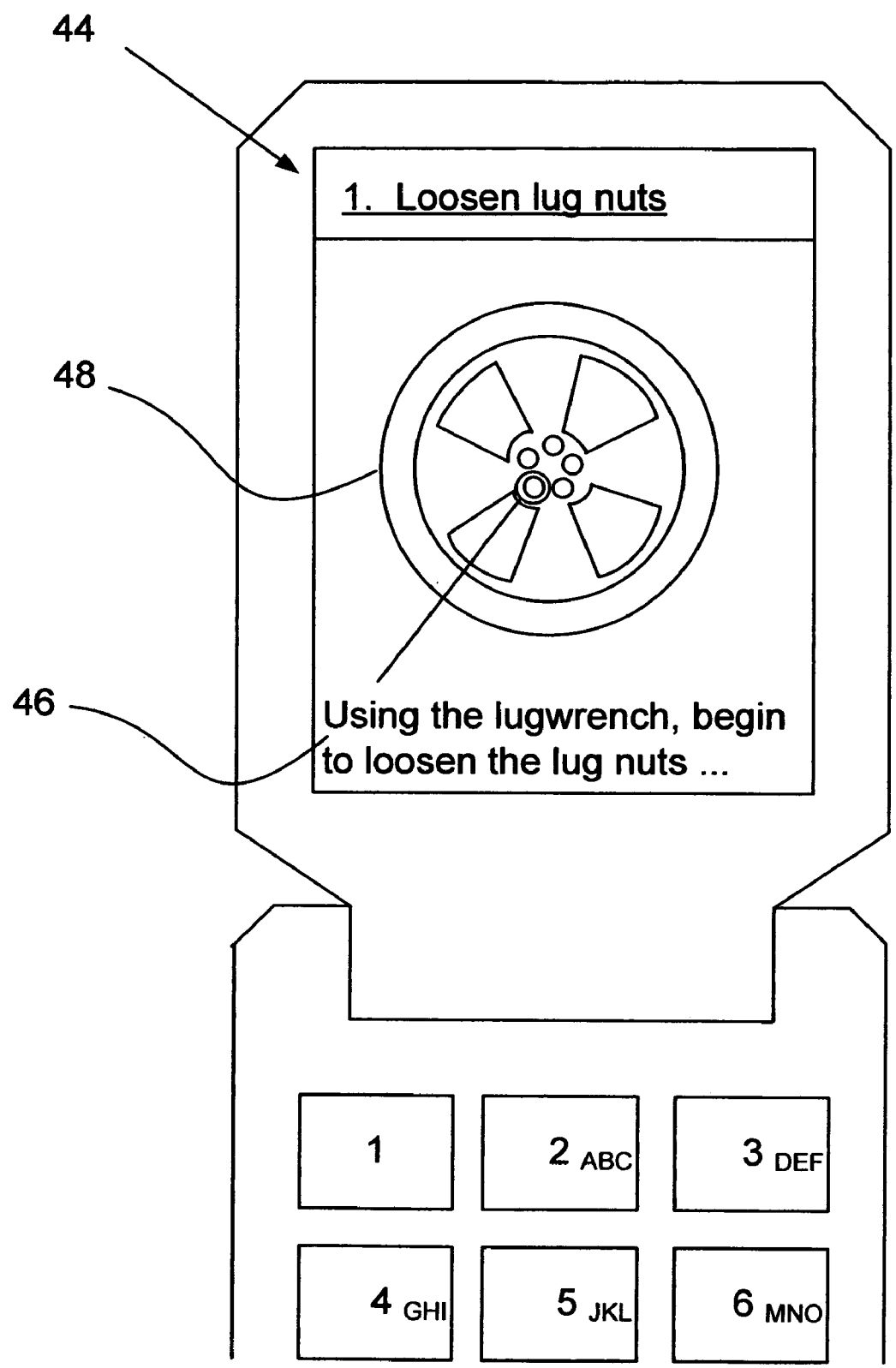
FIG. 5 is a perspective view, showing a step display.

Whenever the user selects user select item 22, the system accesses the sequential procedural instructions corresponding to the selected emergency procedure via retrieve item 24 and displays the information to the user via procedure display 56. Examples of presentations of procedure display 56 are shown in FIGS. 4 and 5.

End 26 is provided as a terminal to the function. Menu return 50 may be provided to allow a simple mechanism for the user to return to the menu. Menu return 50 could also route the user back to system start 12 for cellular phones which do not use a menu as a default. Menu return 50 can also be provided at list display 54 and procedure display 56 to allow the user to return to the menu at any point in the program. "Back" or "previous" commands can also appear throughout the sequence displays to enable the user to go back to the previous display.

Figure 2:
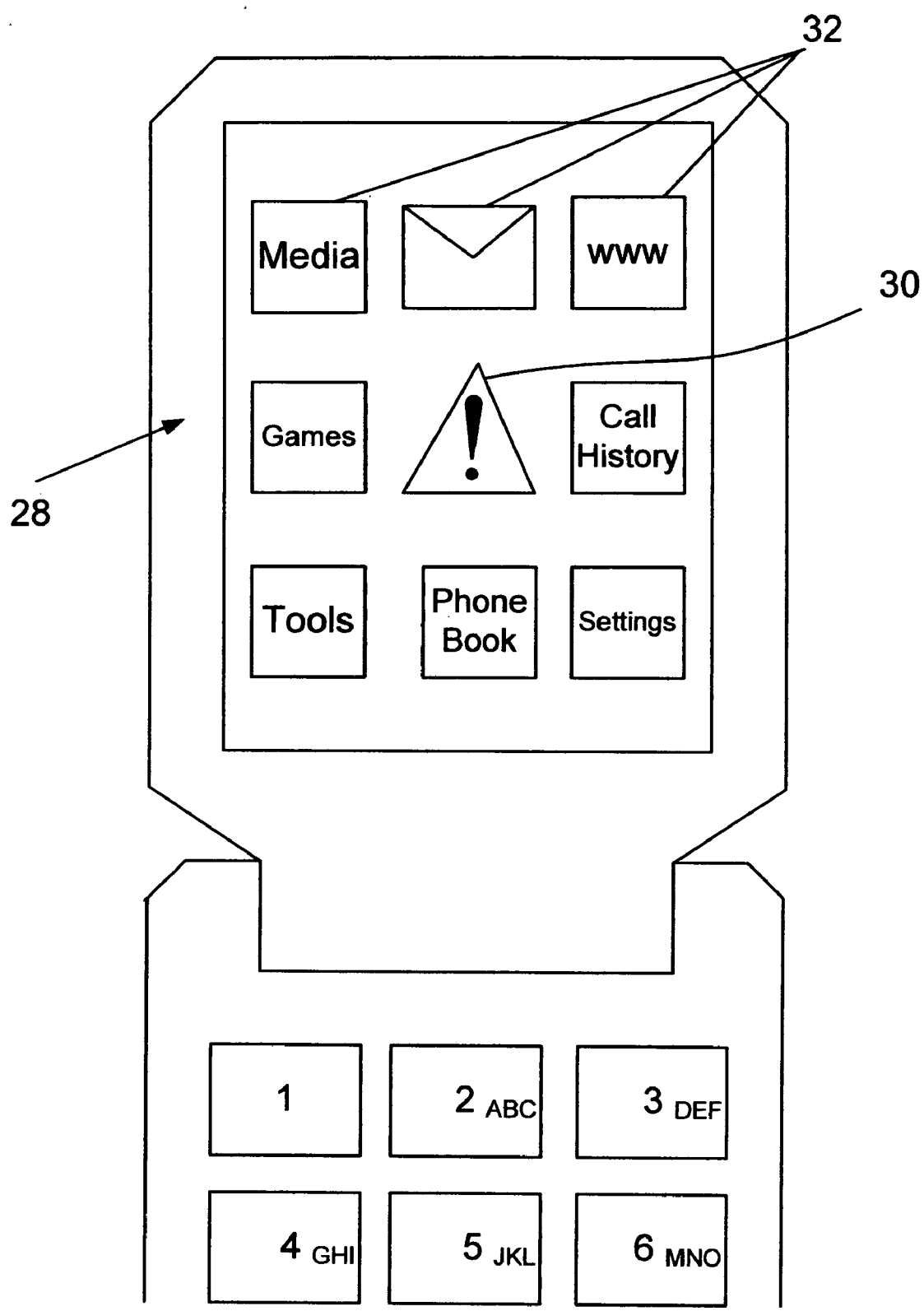
FIG. 2 is a perspective view, showing a menu display.

As mentioned previously, one possible presentation of a menu display is illustrated in FIG. 2. Menu display 28 is generally a graphical user interface displaying a variety of menu icons 32. The viewer will note that emergency instruction icon 30 is provided to allow the user to access emergency instructional information. Although a graphical user interface of menu icons 32 is illustrated, menu display could also feature a simple listing of the available programs and functions. A directional pad may be provided as part of the cellular phone to allow the user to cursor across the icons or down the list to the desired application.

If the user selects emergency instruction icon 30, a function is triggered that recalls a list of all available emergency procedures from internal memory 28. These available emergency procedures are displayed in list form for the user's convenience. An example of an emergency instruction list display is provided in FIG. 3. Emergency instruction list display 38 provides the user with a series of emergency situations for which sequential procedural instructions are available. Procedures links 34 are provided as a selection means for the user to select the desired set of sequential procedural instructions. A variety of selection means can be provided for allowing the user to select the desired set of sequential procedural instructions. For example, the user can press the number on the cellular phone touchpad that corresponds to the list number of the desired instructions. Cursor select aid 36 can also be provided on cellular phones with directional pads so that the user may cursor to the desired emergency situation and press a selecting button.

While the sequential procedural instructions for many different types of emergency situations can be programmed into internal memory 18 of the cellular phone, FIG. 3 lists several common emergency situations. These emergency situations include replacing a flat tire, handling a car wreck, rescuing a person who is choking, rescuing a person who is drowning, handling a stranded boat, and rescuing a person who is undergoing cardiac arrest. Other emergency instructions that are not listed in FIG. 3 can also be provided including jump starting a car, preventing hypothermia, fashioning a tourniquet, and helping your chances of being found when lost.

Since many individuals panic in emergency situations, it is preferred for the emergency instructions to be presented as a set of sequential procedural instructions. For example, it is desirable to tell the user what to do first, second, third, and so on. This presentation of instructions allows the user to focus on resolving the emergency situation. One example of a display for the emergency procedure is illustrated in FIG. 4. A set of sequential procedural instructions for changing a flat tire is shown in procedure display 40. Similar to the presentation of the list of emergency situations in FIG. 3, the sequential procedural instructions are provided in list format. Step links 42 are provided to allow the user to access more detailed instruction as will be illustrated later. As with the selection of the desired emergency situation, various selection means can be provided so that the user can select an instruction for which greater explanation is desired. The user may press the number corresponding with the desired step or may use cursor select aid 36 and the directional pad to select the desired step.

An example of how detailed explanation can be presented is illustrated in FIG. 5. If the user wants more explanation about "loosening lug nuts," the user uses a selection means to pick this step. Step display 44 provides more detail to the user about how to loosen a lug nut. Although many different presentations can be used for providing detailed explanation, using a combination of graphics and textual explanations is preferred. As illustrated in FIG. 5, graphic 48 shows the user a picture of a tire and indicates where the lug nuts are. Graphic 48 can be a picture, video clip or other pictorial representation. Explanation 46 provides a greater textual description of the step.

Like the list of emergency situations and the set of sequential procedural instructions corresponding to the emergency situations, the detailed explanations are also stored in internal memory 18 of the cellular phone. Those that are skilled in the art will appreciate that all of this information can be indexed in order to expedite the recalling process.

Although the preceding descriptions contain significant detail they should not be viewed as limiting the invention but rather as providing examples of the preferred embodiments of the invention. As one example, the sequential procedural instructions may also be presented as rerecorded instructions. Changing the presentation of the sequential procedural instructions, however, does not depart from the spirit and scope of the invention. Accordingly, the scope of the invention should be determined by the following claims, rather than the examples given.

Having described my, I claim:

1. A method for allowing a user to access emergency instructional information on a cellular telephone comprising:
   a. providing sequential procedural instructions configured for assisting said user in managing a plurality of emergency situations, wherein said sequential procedural instructions are provided in the memory of said cellular telephone such that said user is not required to download said sequential procedural instructions from another source when said emergency situation arises;
   b. providing a function of said cellular telephone for allowing said user to access said sequential procedural instructions;
   c. providing a display means on said cellular telephone for showing said sequential procedural instructions;
   d. providing a selection means for allowing said user to select one of said plurality of emergency situations for which said user desires said emergency instructional information;
   e. wherein said series of steps are displayed in a list form such that said series of steps are displayed together in sequence within said display means; and
   f. wherein said sequential procedural instructions include step links whereby said user can select one of said series of steps displayed in said list form to access greater explanation of a selected one of said series of steps than was displayed when said series of steps was displayed in said list form; and
   g. wherein said selection means is configured to activate said function when said user selects said one of said plurality of emergency situations.

2. The method of claim 1, wherein said sequential procedural instructions include a series of steps for managing one of said plurality of emergency situations.

3. The method of claim 1, wherein said plurality of emergency situations are displayed in the form of a list.

4. A portable electronic device adapted for allowing a user to access emergency instructional information comprising:
   a. a cellular telephone, including
      i. an internal memory configured to store data;
      ii. a display means configured to display a representation of said data to said user;
   b. a first set of sequential procedural instructions configured for assisting said user in managing a first emergency situation, wherein said first set of sequential procedural instructions are permanently provided in said internal memory of said cellular telephone such that said user is not required to download said sequential procedural instructions from another source;
   c. a function for recalling said first set of sequential procedural instructions and displaying said first set of sequential procedural instructions on said display means of said cellular telephone;
   d. a selection means for allowing a user to select said function;
   e. a second set of sequential procedural instructions configured for assisting said user in managing a second emergency situation;
   f. wherein said selection means allows the user to make a selection between said first set of sequential procedural instructions for managing said first emergency situation and said second set of sequential procedural instructions for managing said second emergency situation;
   g. wherein said first set of sequential procedural instructions include a series of steps for managing said first emergency situation, and wherein said series of steps are displayed in a list form such that said series of steps are displayed together in sequence within said display means; and
   h. wherein said first set of sequential procedural instructions include step links whereby the user can select one of said series of steps displayed in said list form to access greater explanation of a selected one of said series of steps than was displayed when said series of steps was displayed in said list form.

5. The portable electronic device of claim 4, wherein said first emergency situation and said second emergency situation are displayed in the form of a list.

6. The portable electronic device of claim 4, wherein said first set of sequential procedural instructions include a series of steps for managing said first emergency situation.

* * * * *